United States Patent Office 3,383,780
Patented May 21, 1968

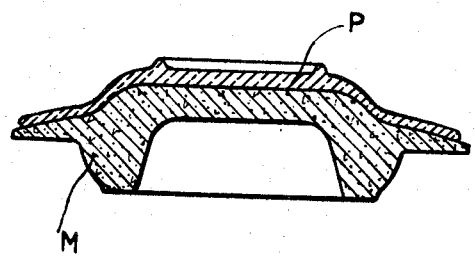
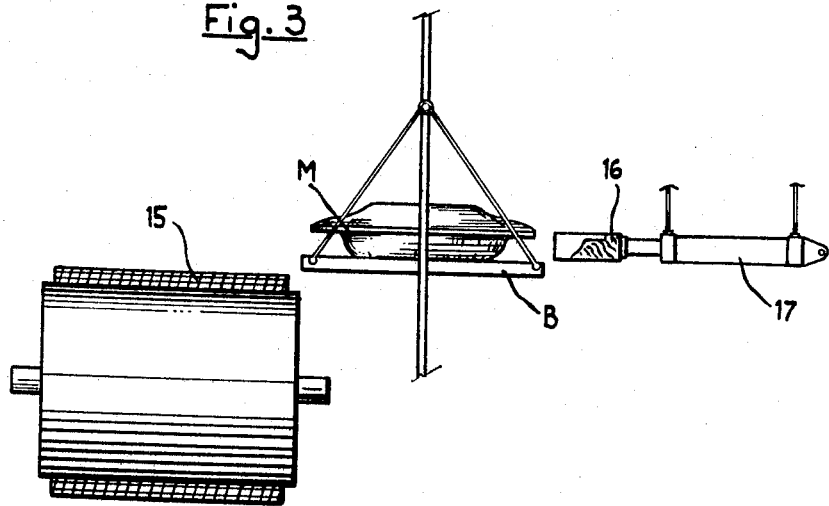

3,383,780
APPARATUS FOR DRYING CERAMIC WARE
Antonio Lampani and Gianni B. Margola, Milan, Italy, assignors to Società Ceramica Italiana Richard-Ginori S.p.A., Milan, Italy
Filed Feb. 8, 1966, Ser. No. 525,989
Claims priority, application Italy, Sept. 15, 1965, Patent 728,251
8 Claims. (Cl. 34—203)

ABSTRACT OF THE DISCLOSURE

Apparatus for drying ceramic ware in which a conveyor passes through an enclosure surrounding opposite sides and top of a room whereat loading and unloading stations are located. Conveyor belts move ware to loading station whereat pusher loads a tray connected to conveyor. The same arrangement is used at unloading station.

---

This invention relates to installations suitable for carrying out, under entirely mechanized conditions of feeding, discharging and so forth, the drying of moulded, wet shaped or other fabricated ceramic stock discs which constitute semi-finished items for the industrial manufacturing of crockery and plates (e.g., dinner plates and soup plates) made from ceramic stock.

In particular, the present invention relates to mechanized drying installations suitable to form one of the components of a mechanized unit for the manufacturing of said items and articles of ceramic stock, within which unit is also included a shaping machine or other equipment operating according to the wet process for ceramic discs.

An object of the present invention is the provision of a mechanized installation for carrying out the drying of discs or plates of ceramic stock, suitable to operate in synchronism with and according to the manufacturing rate of a moulding machine, from which the shaped semi-finished products are obtained in the form of wet, soft pieces adhering to an underlaying shaping mould, on which each single piece is arranged upturned. The installation of the invention, is accordingly characterized in that it comprises systems for the feeding and releasing of the moulds and of the shaped semi-finished products. In order to attain that the drying stage is carried out with proper conditions, a feeding system is provided which comprises one conveyor belt or carpet, said belt having a length sufficient to permit that on the same can be supported and aligned a number of shaped pieces and having mechanical means, in particular a pushing means, operating transversely of the length of the belt during a resting period of intermittent movement of the latter, thus simultaneously transferring all the shaped pieces present on said belt or any selected portion of the same, onto a supporting balancing shelf having the purpose of transporting the pieces along a circular path internally of the drying area. Moreover the installation embodies a chain conveyor system circulating within said area and with a development sufficient to attain that the entire circulating travel corresponds to the time required for the drying process. The conveyor system comprises a plurality of support balancing shelves, in particular articulated on catenaries, in order to ensure a horizontal position. Balancing elements are provided at the position where said pushing means transfer the said shaped pieces. Said installation is moreover characterized by the fact that the chain conveyor system is in turn actuated in order to attain an intermittent movement having rest stages during which the pieces are charged, under the action of said pushing means, the said intermittent movement being synchronized to the action of said pushing means and the intermittent movement of said feeding conveyor belt.

The installation of this invention is further characterized by the fact that it includes a system for discharging the shaping moulds and in turn comprising one pushing means and one conveyor belt for receiving and moving away said moulds, and fitted with intermittent and synchronized movements in order to attain the transferring of the dried moulds onto said feeding conveyor belt, during the period of times during which the different conveyor mechanical means are not operating.

The above and other specific features of the installation of this invention will become apparent during the course of the following detailed description covering an example of the same, and shown in the accompanying figures wherein:

FIG. 2 is a cross section of a wet-shaped piece, supported by a shaping pattern; and FIG. 3 is a schematic cross-sectional view of a pushing type transferring system.

Figure 1:
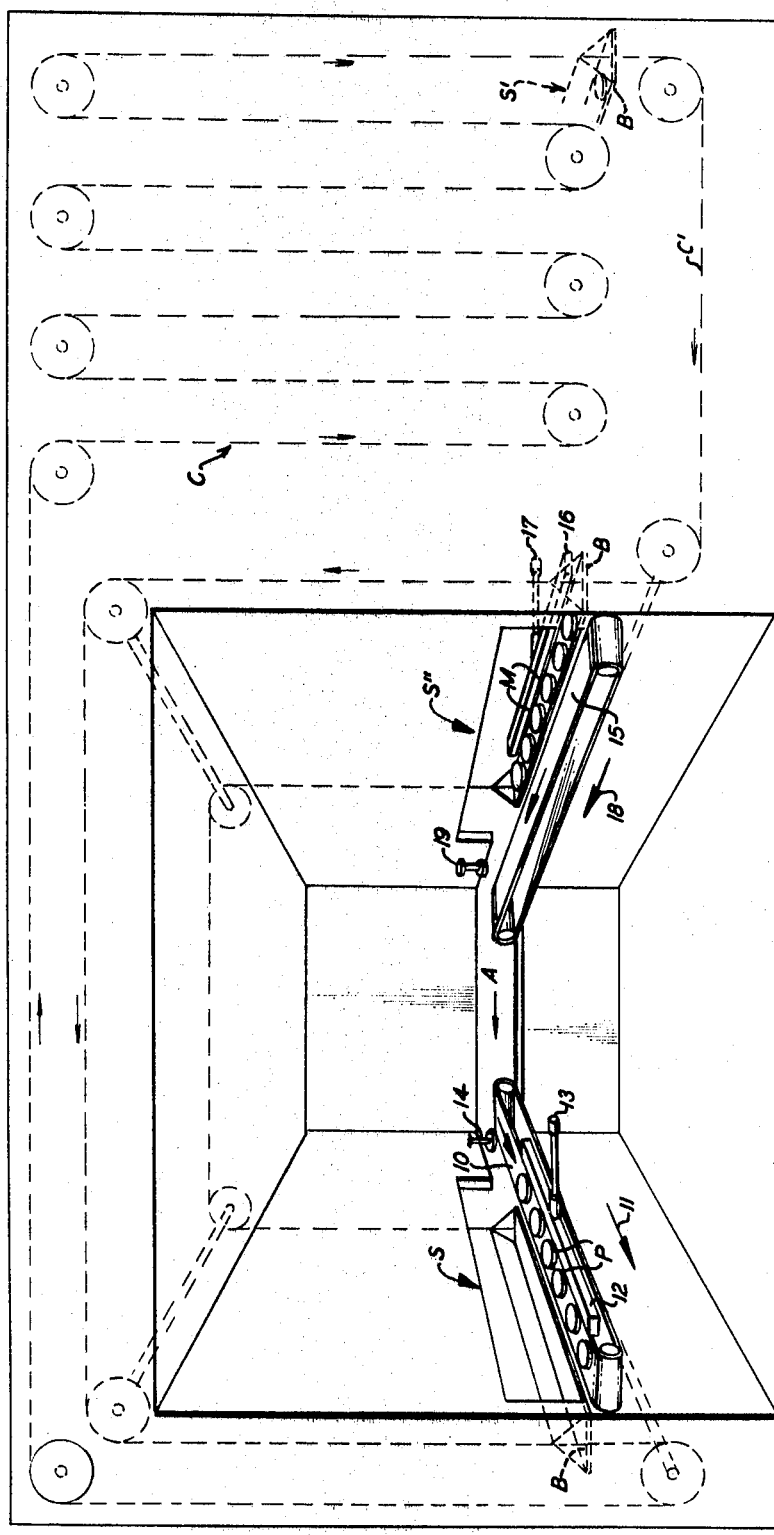
FIG. 1 is a schematic, perspective view of an area including a station for loading the shaped pieces.

The semi-finished products, shaped and wet moulded of ceramic stock, are to be dried while supported, upturned, on a suitable plaster pattern. FIG. 2 exemplifies, in cross section, a plate P shaped on the related pattern M. In this condition, the semi-finished product is submitted to a drying stage, which is extended for a predetermined period of time, within a closed room which is opportunely conditioned. As far as known in the art, known driers for ceramic items include one catenary and oscillating conveyor system, in which system a long catenary, including a plurality of transmissions, for example, running along the path indicated at C in FIG. 1 in the direction indicated by the arrows, supports a large amount of oscillating supports B, only a portion of the supports B having indicated in the figure. On each of said oscillating supports, comprising a shelf or tray with a length sufficient to support a plurality of pieces, a similar plurality of pieces is carried along the path C in order to be submitted to the required drying process.

When the drying process is finished, the dried plates are removed from the patterns and sent on for further treatment, while said patterns are recovered for the further use.

According to a preferred embodiment, the installation of this invention includes a loading station S, one removal and moving away station S' for the dried ceramic semi-finished products, and one mechanized station S" for discharging and returning the patterns or moulds to the installation, where the plates are shaped. The arrow A schematically indicates the re-use of said patterns which, after having been loaded with a new plate shaped at A are returned, along with the latter, to the loading station S.

A feature of the invention, relates to the fact that, in correspondence with both said stations S and S" are provided means for mechanizing the transferring operations occurring there.

The plates, shaped by the moulding machine, still wet and soft and fixed to the underlying related patterns or form, are fed in succession in the shaping machine (not shown) on a conveyor belt 10 at a rate generally established by the productive capacity of said machine. The rate of said belt 10 is regulated to attain that the single pieces P, present on the same, are spaced according to a minimum dimension compatible with the process. Said conveyor belt 10 extends along the whole length of the loading station S, thus facing the oscillating supports B which in turn will face in succession said station. The belt 10 is actuated in accordance with an intermittent feeding movement of the plates in the direction indicated by the arrow 11.

The intermittent movements of belt 10 are synchronized with the similarly intermittent movements of the catenary system carrying the supporting elements along the path C internally of the conditioned drying room, in order that all the oscillating supports will undergo a rest period, one after the other, in correspondence to the loading at station S and in order that the related trays will be, one by one, coplanar to said conveyor belt 10, or preferably slightly lower elevation.

Moreover the synchonization between the intermittent movements of belt 10 and of the catenary is established in order to get that one oscillating supporting element will face the loading station following a number of steps, by the part of said belt 10, equal to the amount of pieces which can at the same time be loaded onto the tray or shelf of the oscillating elements. The drier feeding mechanizing mechanism is completed by a pushing system, comprising a bar 12, which at its rest position is arranged laterally of belt 10 and which, actuated by a hydraulic or air operated piston 13, will push and transfer the plurality of pieces P, facing the oscillating supporting element B, onto the tray or shelf of the latter, the movement of said pushing system being in turn synchronized in order that its action corresponds to a rest period of the conveyor belt.

The transferring of the pieces to be dried to the drier unit is thus insured with a maximum efficiency of the latter without manual operation.

The transferring operation can be preceded by other actions, for example a stamping action, which can also be carried out by means of mechanical devices, schematically indicated at 14, in order to obtain on the bottom portion of the plate, the data and marks required to identify the origin, type or other characteristics of the manufactured product.

Thereafter, after having travelled along the path C during which occurs the drying stage, the dried plates are removed at the discharging station. The detachment of plates from the patterns is effected manually or by different means, which are not a characteristic of the invention, while the patterns are left on the oscillating supporting elements B.

From the discharging station S', along a final path C', the oscillating elements supporting said patterns will reach the pattern discharging station S" where the latter patterns are returned to the shaping machine or installation. Said discharge is carried out mechanically by transferring the patterns M onto a second conveyor belt 15, by means of a pushing element comprising a bar 16 and a hydraulic or air operated means 17, said belt 15 running in the direction indicated by the arrow 18 to return the patterns to the shaping machine. Said patterns are then re-used under their most favourable drying condition, and the re-cycle system of said patterns can be completed for example by means of a wetting gun 19 which permits to wet, in the required amount and positions, the plaster moulds leaving the drier, in order to improve the manufacturing conditions and the efficiency rate of the automatic shaping machine which again uses the patterns. Obviously the above illustrated means can be replaced by different solutions, which will be within the scope of the present invention as defined by the following claims.

What we claim is:

1. A pottery ware drying apparatus for drying ware supported on patterns, said apparatus comprising enclosure means having a conditioned drying enclosure, an endless conveyor including spaced trays for carrying the patterns, means intermittently driving the conveyor for carrying the patterns through said enclosure along a circuit according to a scheduled program, means providing a loading station along said circuit whereat ware supported on said patterns can be sequentially fed onto said trays, means providing a ware unloading station along said circuit whereat said ware can be removed from said patterns, means providing a pattern unloading station along said circuit wherein said patterns can be removed from said trays, said conveyor being so arranged that when one of said trays is stationary at said loading station another tray is stationary at said pattern unloading station, first and second horizontal conveyor belts respectively located at said loading and pattern unloading stations, said belts being at least substantially parallel to and co-planar with said trays when the latter are stationary at the corresponding stations, means incrementally driving said belts so that said belts are stationary when said trays are stationary, first pusher means for pushing ware from said first belt when the latter is stationary at said loading station to the co-planar tray thereat, and second pusher means for pushing said patterns from each stationary tray at said pattern unloading station onto the belt co-planar therewith at said pattern unloading station.

2. Apparatus as claimed in claim 1 wherein said endless conveyor is at least in part in the shape of a plurality of vertically disposed catenaries.

3. Apparatus as claimed in claim 2 wherein the enclosure means defines an open room at the opposite sides of which the loading and pattern unloading stations are located, said conveyor belts being located in parallel with said room but externally of said enclosure.

4. Apparatus as claimed in claim 3 wherein said endless conveyor is arranged to pass from said pattern unloading station over said room and thence to said loading station.

5. Apparatus as claimed in claim 4 comprising wetting means operatively associated with the belt at the pattern unloading station to wet patterns unloaded at the latter said station.

6. Apparatus as claimed in claim 4 wherein said pusher means extend along the entire lengths of said belts for simultaneously and completely loading and unloading the same.

7. Apparatus as claimed in claim 4 wherein said enclosure extends on opposite side of and on top of said room and is substantially more voluminous on one side of the room than on the other side.

8. Apparatus as claimed in claim 4 wherein all of said stations are at approximately the same level.

References Cited

UNITED STATES PATENTS

| Re. 15,967 | 12/1924 | Sebring | 34—207 |
| 1,603,810 | 10/1956 | Sibson | 34—207 X |
| 2,274,426 | 2/1942 | Miller | 34—204 X |
| 2,547,294 | 4/1951 | Wahl | 25—2 X |
| 2,558,338 | 6/1951 | Clements | 34—203 X |
| 2,573,217 | 10/1951 | Parmelee | 34—207 X |
| 2,603,150 | 7/1952 | Klug | 101—44 |

FREDERICK L. MATTESON, Jr., Primary Examiner

A. D. HERRMANN, Assistant Examiner.